(12) United States Patent
Wijnands et al.

(10) Patent No.: US 8,233,479 B2
(45) Date of Patent: Jul. 31, 2012

(54) PROTOCOL INDEPENDENT MULTICAST IN A POINT-TO-MULTIPOINT NETWORK

(75) Inventors: Jacob Ijsbrand Wijnands, Leuven (BE); Zafar Ali, Windsor (CA); Sameer Gulrajani, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 12/709,271

(22) Filed: Feb. 19, 2010

(65) Prior Publication Data

US 2011/0206045 A1 Aug. 25, 2011

(51) Int. Cl.
*H04L 12/28* (2006.01)
(52) U.S. Cl. ........................................ 370/389; 370/401
(58) Field of Classification Search .................. 370/389, 370/390, 392, 401
See application file for complete search history.

(56) References Cited

U.S. PATENT DOCUMENTS

| 7,477,642 | B2 * | 1/2009 | Aggarwal et al. | 370/390 |
|---|---|---|---|---|
| 7,940,698 | B1 * | 5/2011 | Minei et al. | 370/254 |
| 2009/0161675 | A1 * | 6/2009 | Aggarwal et al. | 370/390 |
| 2009/0175274 | A1 * | 7/2009 | Aggarwal et al. | 370/390 |

OTHER PUBLICATIONS

Minei, I., et al., *Label Distribution Protocol Extensions for Point-to-Multipoint and Multipoint-to-Multipoint Label Switched Paths*, Network Working Group, [online]. 2009 [retrieved on Jan. 8, 2010]. Retrieved from the Internet: <URL: http://tools.ietf.org/pdf/draft-ietf-mpls/ldp-p2mp-08.pdf>, (Oct. 24, 2009), 37 pgs.

* cited by examiner

*Primary Examiner* — Hong Cho
(74) *Attorney, Agent, or Firm* — Schwegman, Lundberg & Woessner, P.A.

(57) ABSTRACT

In one example embodiment, a method of using protocol independent multicast (PIM) in a point-to-multipoint (P2MP) label switched path is provided. In this method, a label uniquely identifying the P2MP label switched path from different P2MP label switched paths is advertised. In response to the advertisement, a PIM message is received by way of a point-to-point (P2P) label switched path. This PIM message includes the advertised label. The label included in the PIM message is identified to correspond with the P2MP label switched path and the PIM message is reflected by way of the P2MP label switched path based on the identification.

20 Claims, 8 Drawing Sheets

PROTOCOL INDEPENDENT MULTICAST IN A POINT-TO-MULTIPOINT NETWORK

FIELD

The present disclosure relates generally to computer networks.

BACKGROUND

Protocol independent multicast (PIM) is a family of multicast routing protocols for Internet Protocol (IP) networks that provides the distribution of data over a local area network (LAN), wide area network (WAN), or the Internet. In a virtual private network (VPN) with hub and spoke deployment, data is typically transmitted from a single hub to multiple spoke sites. For example, in a multicast VPN, sources of data are mostly co-located in a data center and accordingly, data is transmitted from a single site (e.g., data center) to multiple sites by way of point-to-multipoint (P2MP) label switched paths. If PIM is used in the hub and spoke deployment to assign data traffic to one or more P2MP label switched paths, it needs bidirectional connectivity, such as a full mesh. However, the construction and maintenance of a full mesh may, for example, consume a large amount of bandwidth. Furthermore, a P2MP label switched path is unidirectional, and is therefore incompatible with the bidirectional nature of PIM.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

In one example embodiment, a method of using protocol independent multicast (PIM) in a point-to-multipoint (P2MP) label switched path is provided. In this method, a label uniquely identifying the P2MP label switched path from different P2MP label switched paths is advertised. In response to the advertisement, a PIM message is received by way of a point-to-point (P2P) label switched path in response to the advertisement. This PIM message includes the advertised label. The label included in the PIM message is identified to correspond with the P2MP label switched path and the PIM message is reflected by way of the P2MP label switched path based on the identification.

In another example embodiment, a method of using PIM in a P2MP label switched path is provided. In this method, a label by way of a P2MP label switched path is received. Similarly, this label uniquely identifies the P2MP label switched path from different P2MP label switched paths. A PIM message associated with the P2MP label switched path is identified and the label is encoded with the PIM message. The PIM message is then transmitted by way of P2P label switched path.

EXAMPLE EMBODIMENTS

Figure 1:
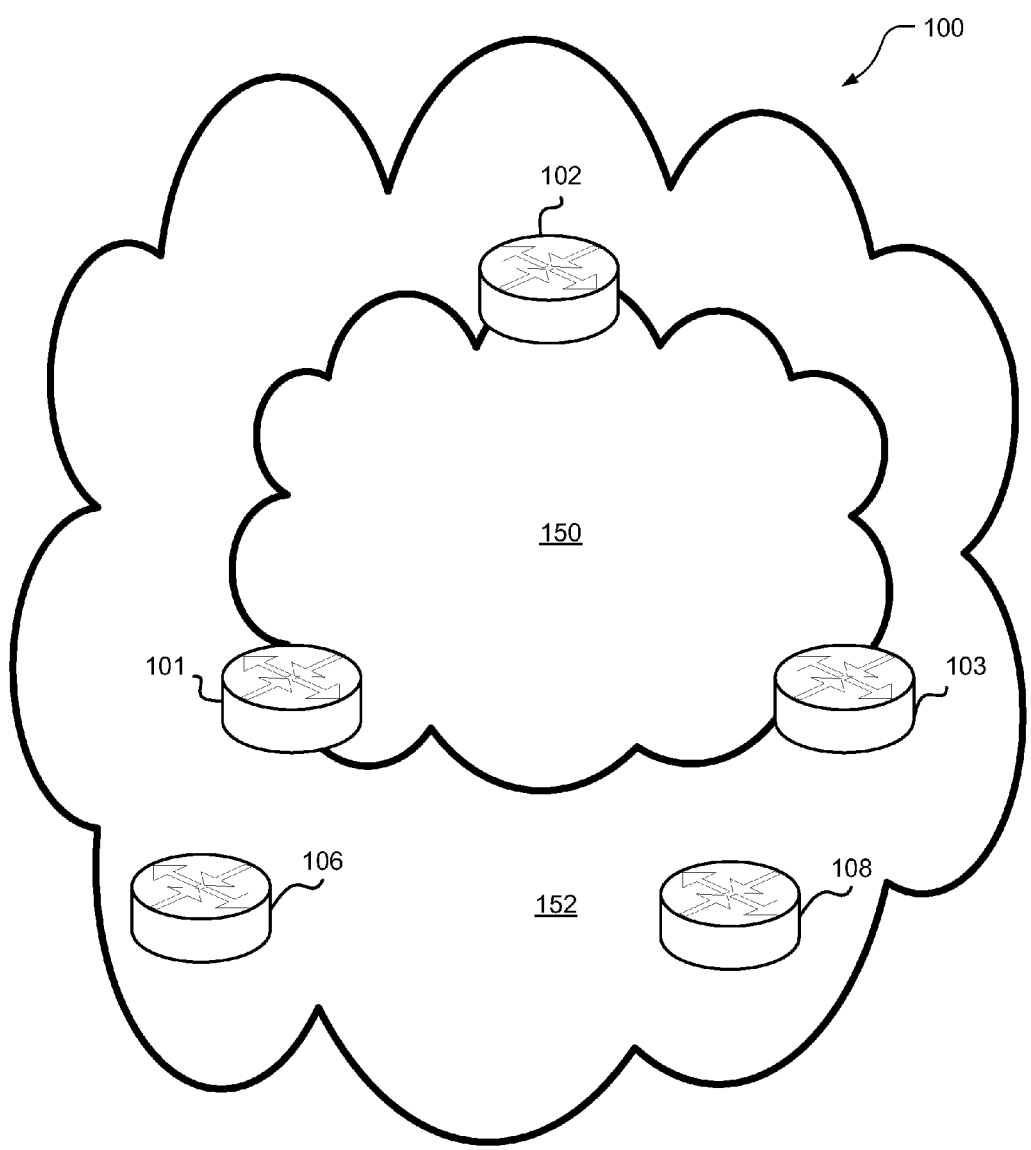
FIG. 1 depicts a diagram of an example of a computer network, consistent with an example embodiment.

FIG. 1 depicts a diagram of an example of a computer network 100, consistent with an example embodiment. This computer network 100 includes a provider domain 150 (or core network) and a customer domain 152 that are interconnected by routing devices 101-103, 106, and 108. A domain (e.g., the provider domain 150 or the customer domain 152) is a collection of network nodes under the control of one or more entities that present a common routing policy. In one embodiment, the provider domain 150 is a multicast virtual private network (MVPN). In general, a multicast network is used for distributing data or traffic to multiple receivers at approximately the same time. For example, a multicast packet has a single source Internet Protocol (IP), but it has a multicast destination IP address that is delivered to a group of receivers. In MVPN, multicast packets from a virtual private network are encapsulated and routed within the provider domain 150.

The distinct networks within domains 150 and 152 can be coupled together by the routing devices 101-103, 106, and 108. For Layer-2 services, the routing devices 101-103, 106, and 108 are configured to communicate by way of, for example, Border Gateway Protocol (BGP). A provider edge (PE) routing device (e.g., PE routing devices 101-103) is an example of an inter-domain routing device. APE routing device 101, 102, or 103 can be placed at the edge of a Service Provider (SP) network, and may communicate by way of a routing protocol to another PE routing device or domain. A customer edge (CE) routing device (e.g., CE routing devices 106 and 108), which may be a multi-homed device, can be located at the edge of a network associated with a customer or subscriber. It should be noted that a number of network nodes (e.g., routing devices 101-103, 106, and 108) and communication links may be included in the computer network 100, and that the computer network 100 depicted in FIG. 1 shown herein is for simplicity.

Figure 2:
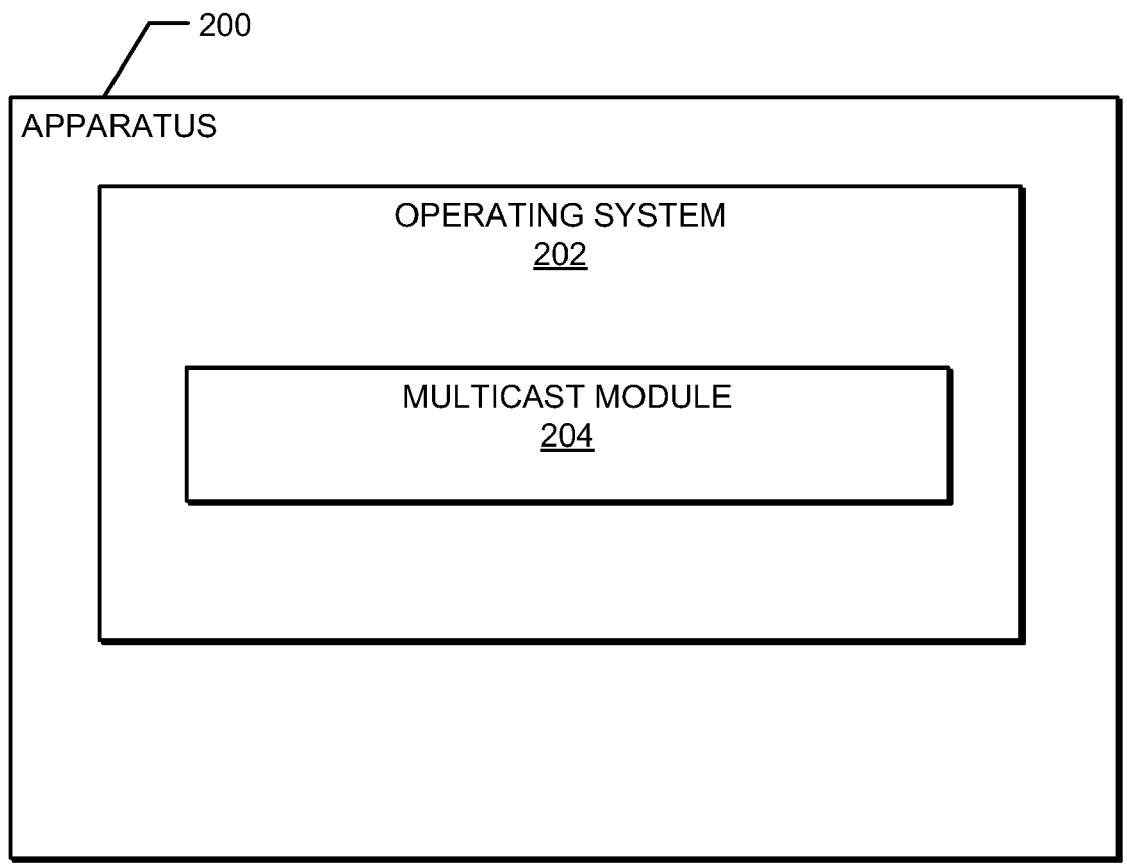
FIG. 2 depicts a block diagram of a multicast module, in accordance with an embodiment, included in an apparatus.

FIG. 2 depicts a block diagram of a multicast module 204, in accordance with an embodiment, included in an apparatus 200. It should be appreciated that the apparatus 200 may be deployed in the form of a variety of routing devices, such as the PE routing devices 101-103 and CE routing devices 106 and 108 depicted in FIG. 1. In various embodiments, the apparatus 200 may be used to implement computer programs, logic, applications, methods, processes, or other software to implement PIM in a P2MP network, as explained below.

The apparatus 200 includes an operating system 202 (e.g., an Internetworking Operating System) that manages the software processes and/or services executing on the apparatus 200. As depicted in FIG. 2, these software processes and/or services may include a multicast module 204. In general, the multicast module 204 is adapted to allow PIM to operate over a P2MP label switched path. It should be appreciated that PIM is a family of multicast routing protocols for Internet Protocol (IP) networks that provides the distribution of data over a local area network (LAN), wide area network (WAN), or the Internet. PIM is used for routing to multicast groups that might span wide-area and inter-domain internetworks, and is "protocol independent" because PIM does not depend on a particular unicast routing. A P2MP label switch path is a label switch path that has one ingress label switch routing device and one or more egress label switch routing devices. An ingress label switch routing device functions as a sender of a label switched path. An egress label switch routing device functions as a receiver of a label switched path. As an example, a P2MP label switched path may be comprised of multiple traffic engineering links from one ingress label switch routing device to multiple egress label switch routing devices.

As explained in more detail below, the multicast module 204 can use a label to uniquely identify a P2MP label switched path. A label is a fixed length identifier that is used to identify a forwarding equivalence class, but in embodiments of the present invention, may also be used to identify a P2MP label switched path. This label used to identify a P2MP label switched path may also be referred to as a "PIM interface label." The multicast module 204 advertises this label to other apparatuses (e.g., routing devices). With the label associated with each P2MP label switched path identified, each routing device can selectively choose which P2MP label switched path to join or remove itself from using the labels as identifiers, as explained in more detail below.

It should be appreciated that in other embodiments, the apparatus 200 may include fewer or more modules apart from those shown in FIG. 2. For example, the multicast module 204 may be separated into two modules where one module is adapted to advertise labels while another module is adapted to reflect any received PIM messages, as also explained in more detail below.

Figure 3:
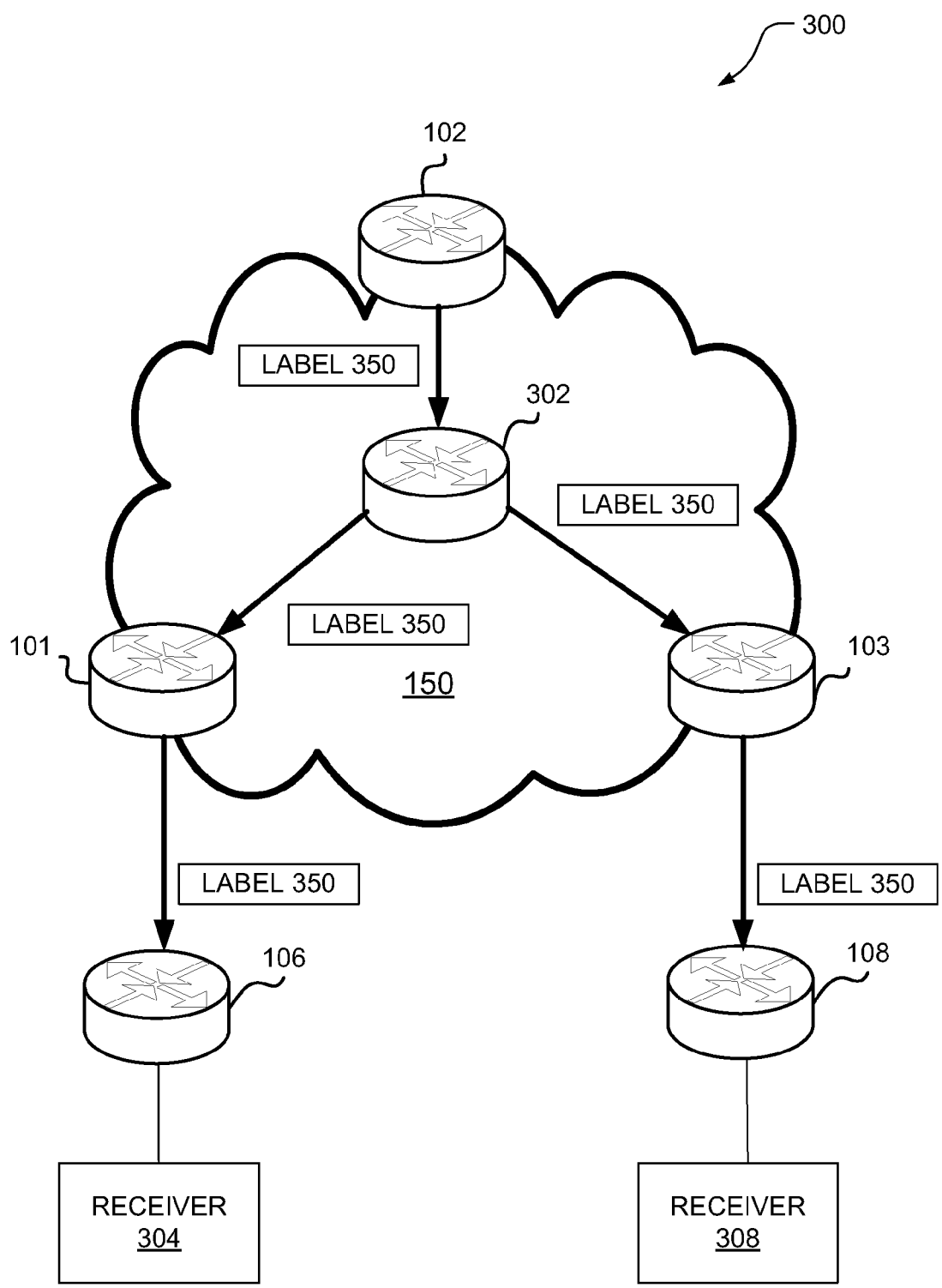
FIG. 3 depicts a diagram illustrating the advertisement of one or more labels, in accordance with an example embodiment.

FIG. 3 depicts a diagram illustrating the advertisement of one or more labels, in accordance with an example embodiment. The computer network 300, as depicted, includes a provider domain 150 that is interconnected by PE routing devices 101-103 and 302. Additionally included in the computer network 300 are CE routing devices 106 and 108 that are in communication with the PE routing devices 101 and 103, respectively. The computer network 300 also includes receivers 304 and 308 that are connected to CE routing devices 106 and 108, respectively.

This computer network 300 may, for example, be configured to transmit data, such as video feeds, to multiple receivers 304 and 308. As depicted in FIG. 3, a P2MP label switched path is set up or established between the routing devices 101-103, 302, 106, 108, 304, and 308 such that data traffic is distributed downstream from routing device 102 to multiple receivers 304 and 308. In this example, the routing device 102 as a source is configured to transmit the same data to receivers 304 and 308. The receivers 304 and 308 may, for example, be cable set-top boxes that are configured to receive video feeds and display them on a television. Each receiver 304 or 308 may request different video feeds, and each video feed can be associated with a different P2MP label switched path. For example, the receiver 304 may request a particular video feed, and this data traffic that includes the particular video feed can traverse a P2MP label switched path that includes, for example, routing devices 302, 101, and 106. In another example, the both receivers 304 and 308 may simultaneously request the same video feed, and this data traffic traverses a P2MP label switched path that includes all the routing devices 101-103, 302, 106, 108, 304, and 308 depicted in FIG. 3.

In order to uniquely identify each P2MP label switched path such that a routing device 101, 103, 106, or 108 can, for example, selectively join or remove itself from a particular P2MP label switched path, the PE routing device 102 or any other suitable source routing device in the computer network 300 can assign or associate a unique label (e.g., label 350) to each P2MP label switched path, as discussed above. The value of the label 350 may, for example, range from 6 to 1,000,000. The PE routing device 102 then advertises this label 350 downstream along a P2MP label switched path that corresponds to the label 350. It should be noted that the source of the multicast traffic (e.g., PE routing device 102) is considered upstream while downstream is in the opposite direction. In the example depicted in FIG. 3 where the P2MP label switched path includes all the routing devices 101-103, 302, 106, 108, 304, the label 350 is advertised downstream to routing devices 101, 103, 302, 106, 108, and 304.

In advertising the label 350, the PE routing device 102 may encode the label 350 with a PIM hello message, consistent with an example embodiment. It should be appreciated that neighboring routers (e.g., routing devices 101 and 302) may transmit PIM hello messages to each other to discover each other. As depicted in FIG. 3, the PE routing device 102 transmits the PIM hello message, with encoded label 350, to a core PE edge router 302 that is configured to replicate a packet (with the PIM hello message) into two packets for transmittal to PE routing devices 101 and 103. The PE routers 101 and 103 in turn, transmit PIM hello messages, with encoded label 350, to CE routing devices 106 and 108, respectively. In particular, the label 350 may be encoded at the bottom of a Multiprotocol Label Switching (MPLS) stack, which is encoded in front of an IP header. In normal unicast MPLS encoding, a P2P MPLS label is encoded on top of the MPLS stack. Thus, PE routing device 102 forwards the packet based on the bottom stack label because Penultimate Hop Hopping (PHP), for example, strips the P2P MPLS label from the stack. Normal MPLS forwarding then transmits the packet out along the P2MP LSP.

It should be appreciated that a variety of other techniques may be used to advertise the label 350. For example, in an alternate embodiment, the label 350 may also be transmitted by way of BGP Auto-Discovery. It should also be noted that the label 350 is transmitted along the same P2MP label switched path as identified by the label 350. As a result, each routing device 101, 103, 106, 108, or 302 can identify that the particular P2MP label switched path with which it received the label 350, is associated with or identified by the same label 350.

In an alternate embodiment, the PE routing device 102 can additionally encode a static multicast route with the PIM hello message. Static multicast routes are pre-defined multicast routes that cause packets moving between a source and one or more destinations to take a specified path. With a static multicast route, the PE routing device 102 can define a range, such as from 16 to 50, that identifies a particular P2MP label switched path. The use of this static multicast route may, for example, force a multicast to identify the P2MP label switched path as a preferred reverse path forwarding path.

Upon receipt of the static multicast route, each routing device 101, 302, 103, 106, or 108 can install the static multicast route into a multicast routing information base.

Figure 4:
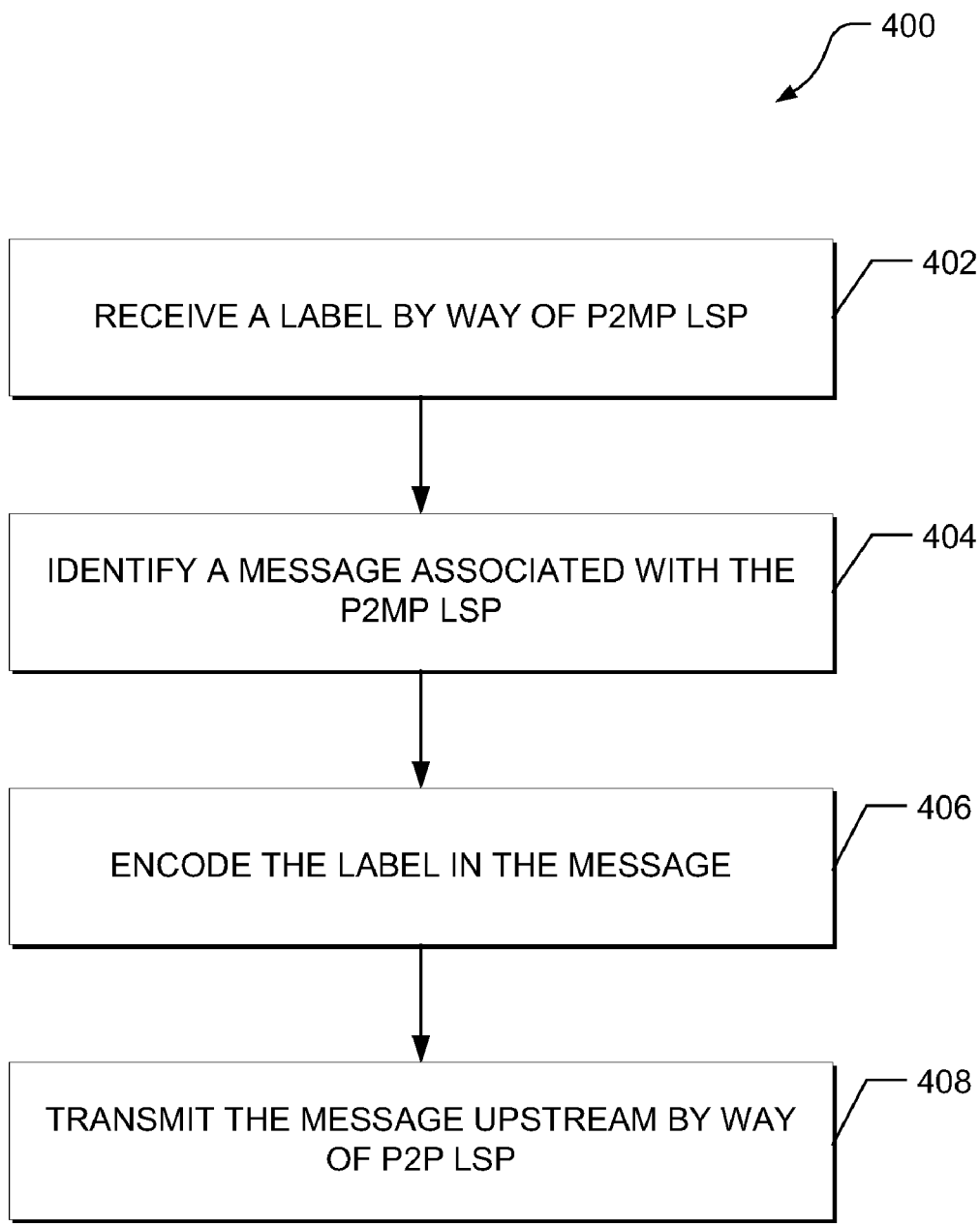
FIG. 4 depicts a flow diagram of a general overview of a method, in accordance with an example embodiment, for transmitting a protocol independent multicast (PIM) message associated with a point-to-multipoint (P2MP) label switched path.

FIG. 4 depicts a flow diagram of a general overview of a method 400, in accordance with an example embodiment, for transmitting a PIM message associated with a P2MP label switched path. In an example embodiment, the method 400 may be implemented by the multicast module 204 and employed in the apparatus 200 of FIG. 2. As depicted in FIG. 4, a routing device associated with a particular P2MP label switched path receives a label by way of the same P2MP label switched path at 402. As discussed above, this label may be advertised by a source routing device and this label is used to uniquely identify a particular P2MP label switched path from other P2MP label switched paths.

At 404, the routing device may identify a PIM message associated with the P2MP label switched path. The PIM message may include a variety of different messages. For example, if the routing device wants to join a particular P2MP label switched path, then the PIM message may be a PIM join message, which is a request to connect or join to a particular P2MP label switched path. If the routing device wants to remove itself from a particular P2MP label switched path, then the PIM message may be a PIM prune message, which is a request to remove itself from the P2MP label switched path.

In order to associate the PIM message with a particular P2MP label switched path, the routing device encodes the label with the PIM message at 406. In one embodiment, this label may be encoded with a unicast label, which is used to reach an ingress routing device. For example, the label may be encoded immediately below or next to the unicast label. It should be noted that in PHP, the unicast label is stripped and as a result, another routing device that receives this PIM message receives the packet with the label that identifies a P2MP label switched path. It should also be appreciated that this label entry can be programmed into a multiprotocol label switching forwarding table as an aggregate entry. It can make use of this capability to let multiprotocol label switching forwarding associate a source interface and a table identifier with packets that were received on that label.

After the label is encoded with the PIM message, the routing device transmits the PIM message upstream by way of a P2P label switched path at 408. A P2P label switched path has one unique ingress label switched path and one unique egress label switched path. It should be noted that the PIM message cannot be transmitted upstream by way of P2MP label switched path because, by its nature, data transmitted by way of P2MP label switched path only flows downstream.

Figure 5:
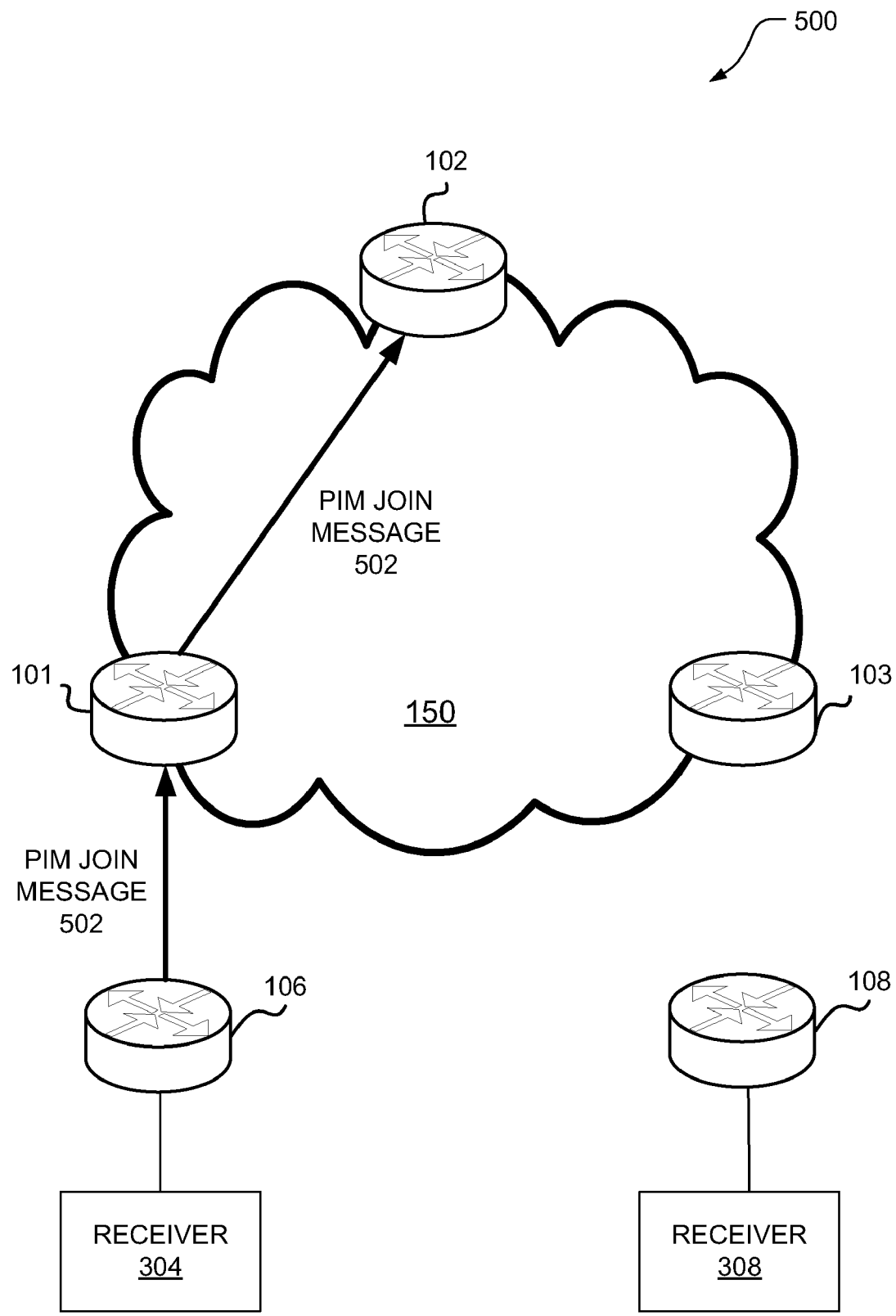
FIG. 5 depicts a diagram illustrating the transmission of a PIM message associated with a P2MP label switched path, in accordance with an example embodiment.

FIG. 5 depicts a diagram illustrating the transmission of a PIM message associated with a P2MP label switched path, in accordance with an example embodiment. This computer network 500, as depicted, includes the provider domain 150 that is interconnected by PE routing devices 101-103. Additionally included in the computer network 500 are CE routing devices 106 and 108 that are in communication with the PE routing devices 101 and 103, respectively. The computer network 500 also includes receivers 304 and 308 that are connected to CE routing devices 106 and 108, respectively.

This computer network 500 is also configured to transmit data by way of P2MP label switched path where multicast traffic is transmitted or distributed downstream from routing device 102 to receivers 304 and/or 308. In this example, the receiver 304 may request a particular video feed that is transmitted by way of a particular P2MP label switched path. In order to receive this video feed, the PE routing device 101 and the CE routing device 106 need to join to the particular P2MP label switched path. For example, the CE routing device 106 transmits a PIM join message 502 to the PE routing device 101 by way of a P2P label switched path. In this PIM join message 502, the CE routing device 106 encodes a label that identifies the particular P2MP label switched path configured to transmit the video feed. As discussed above, the CE routing device 106 (and PE routing device 101) previously received this label from an advertisement. Similarly, the PE routing device 101 also transmits the PIM join message 502 to the PE routing device 102 by way of P2P label switched path encoded with the same label that identifies the same P2MP label switched path to which the PE routing device 101 wants to join.

Figure 6:
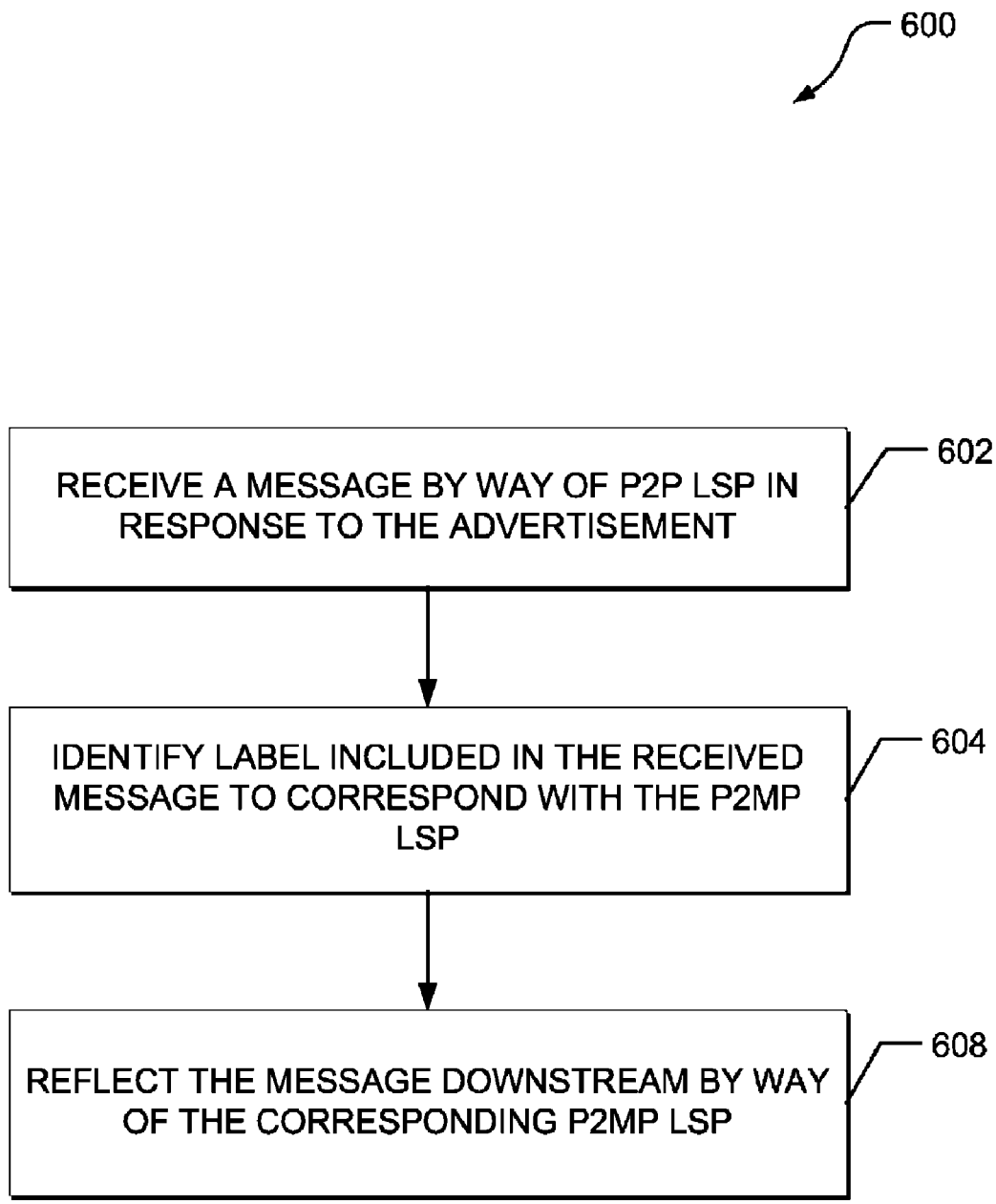
FIG. 6 depicts a flow diagram of a general overview of a method, in accordance with an embodiment, for reflecting received PIM messages downstream.

FIG. 6 depicts a flow diagram of a general overview of a method 600, in accordance with an embodiment, for reflecting received PIM messages downstream. In an example embodiment, the method 600 may be implemented by the multicast module 204 that is employed in the apparatus 200 of FIG. 2. As depicted in FIG. 6, a routing device receives a PIM message at 602 by way of P2P label switched path in response to its previous advertisement of one or more labels identifying one or more P2MP label switched paths. With the receipt of the PIM message, the routing device reads the label encoded with the PIM message and identifies that this read label corresponds to a particular P2MP label switched path at 604. The identification may, for example, be made from a multiprotocol label switching forwarding table that stores associations between each label and its P2MP label switched path.

The routing device then reflects the received PIM message downstream by way of the corresponding P2MP label switched path at 608. It should be appreciated that the routing device may reflect or retransmit the PIM message downstream without any modifications to the PIM message. That is, the routing device loops back the PIM message it received to some or all the downstream routing devices included in the P2MP label switched path identified by the label. The reflection of the PIM messages makes it appear to PIM that the PIM message was received from a multipoint-to-multipoint label switched path. In other words, the reflection of the message is configured to emulate a multipoint-to-multipoint label switched path. The relaying of the PIM message may trigger join suppression at all or some of the downstream routing devices. In particular, the relaying of the PIM message notifies these other downstream routing devices that connectivity between other routing devices in the P2MP label switched path has been established. As a result, these other routing devices may be automatically configured to suppress transmission of any interest for multicast traffic. Depending on the type of PIM message, the relaying of the PIM message may also trigger prune override at all or some of the downstream routing devices. In prune override, these routing devices are configured to automatically suppress transmission of any prune messages.

Figure 7:
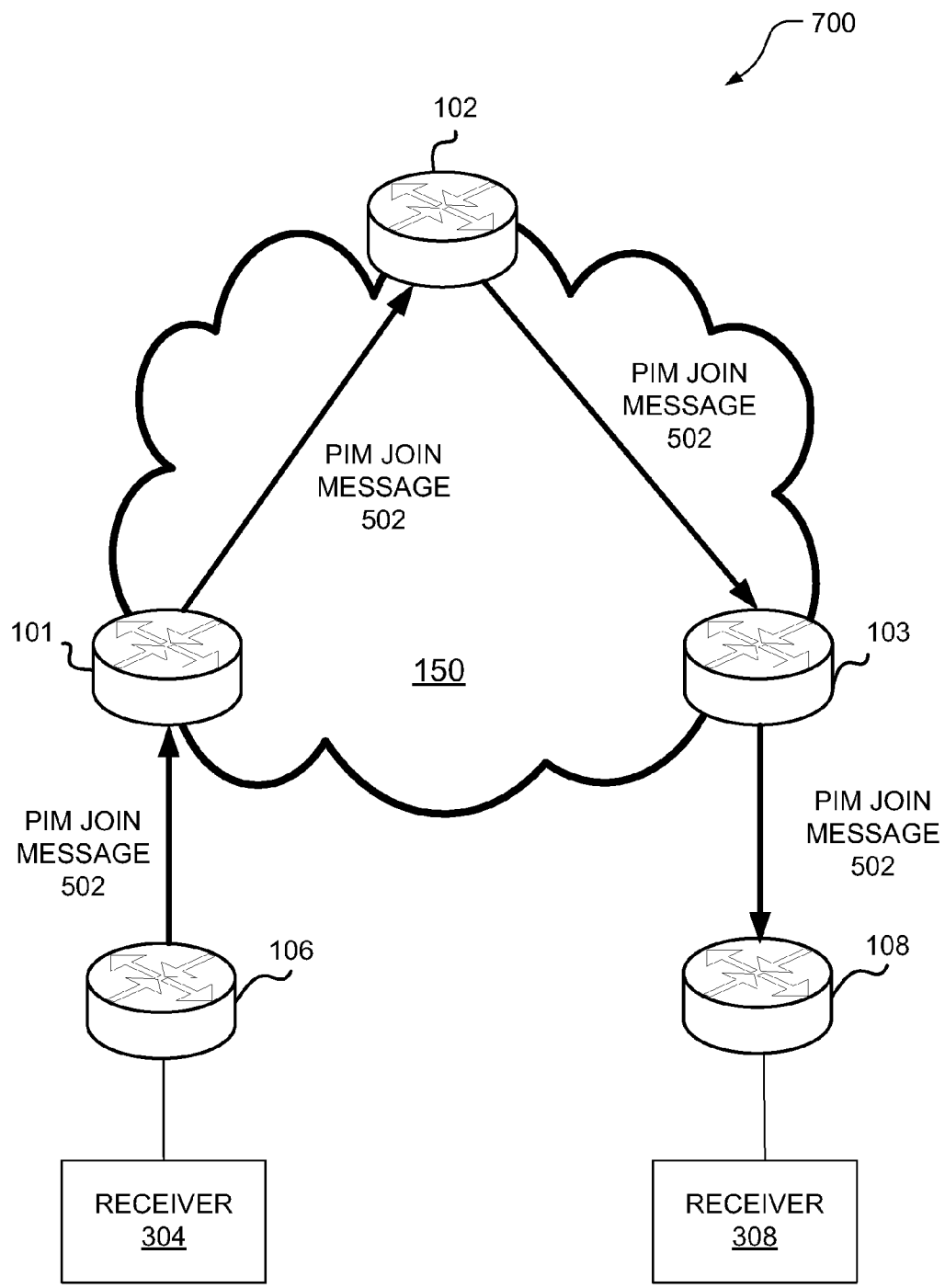
FIG. 7 depicts a diagram illustrating the reflection of a PIM message, in accordance with an example embodiment.

FIG. 7 depicts a diagram illustrating the reflection of a PIM message, in accordance with an example embodiment. Similarly, this computer network 700, as depicted, includes the provider domain 150 that is interconnected by PE routing devices 101-103. Additionally included in the computer network 700 are CE routing devices 106 and 108 that are in communication with the PE routing devices 101 and 103, respectively. The computer network 700 also includes receivers 304 and 308 that are connected to CE routing devices 106 and 108, respectively.

In this example, the receiver 304 requests a particular video feed that is transmitted by way of a particular P2MP label switched path. In order to receive this video feed, the CE routing device 106 transmits a PIM join message 502 to PE routing device 101 and in turn, the PE routing device 101 transmits the PIM join message 502 to the PE routing device 102 by way of P2P label switched path. Encoded with the PIM join message 502 is a label that identifies the particular P2MP label switched path to which the CE routing device 106 and the PE routing device 101 want to join.

Upon receipt of the PIM join message 502, the PE routing device 102 reads the label included in the PIM join message 502 and identifies the label to correspond to a particular P2MP label switched path. The PE routing device 102 then reflects the PIM join message 502, without modification, downstream along the identified or corresponding P2MP label switched path. As a result, the PE routing device 103 may trigger join suppression where it will not transmit any additional PIM join messages to, for example, PE routing device 102. It should be noted that in the reflection, the PE routing device 101 may also receives its PIM join message back from the PE routing device 102. However, the PE routing device 101 is configured to automatically reject any packets that originated from itself.

Figure 8:
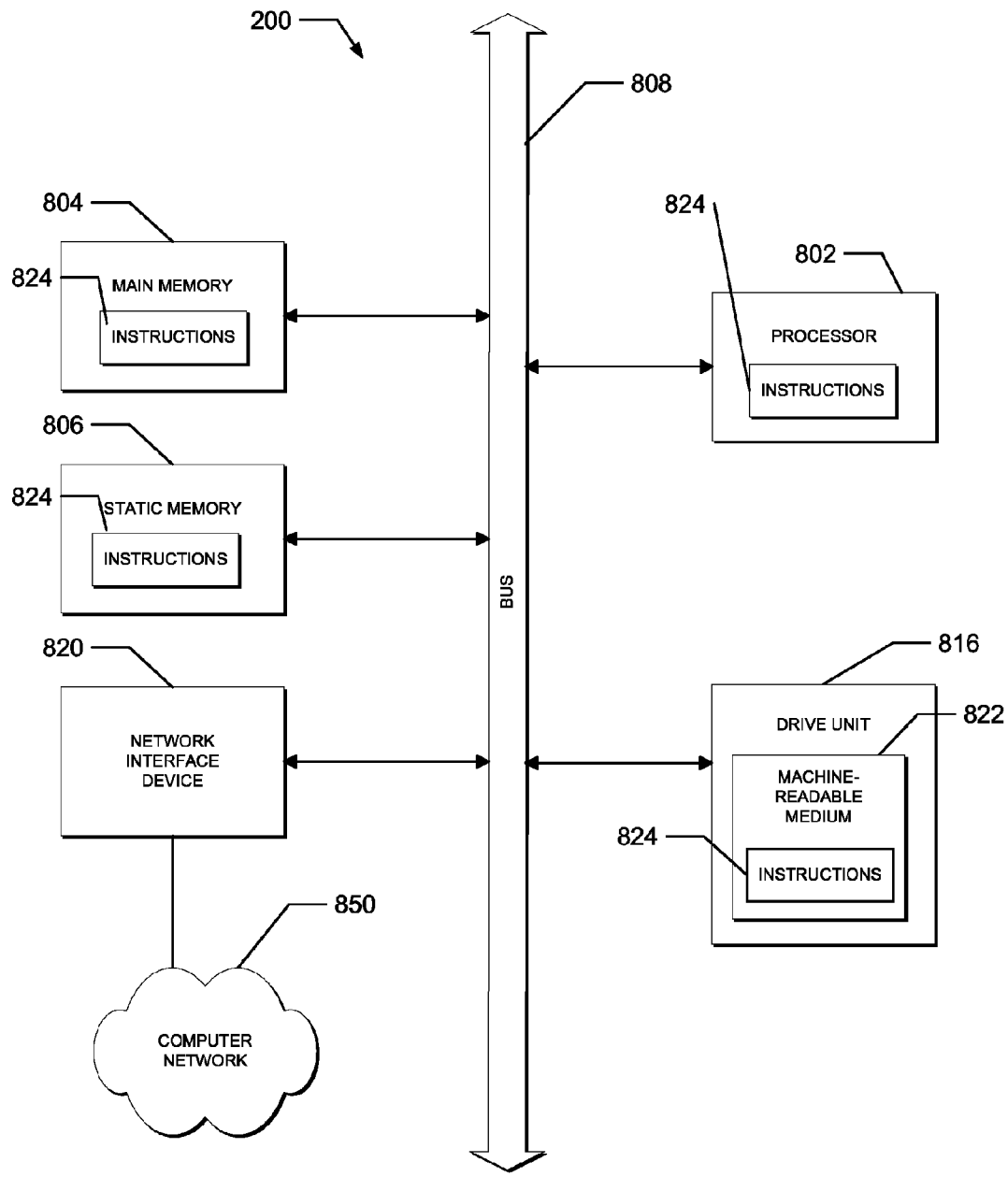
FIG. 8 depicts a block diagram of a machine in the example form of an apparatus within which may be executed a set of instructions for causing the machine to perform any one or more of the methodologies discussed herein.

FIG. 8 depicts a block diagram of a machine in the example form of an apparatus 200 within which may be executed a set of instructions for causing the machine to perform any one or more of the methodologies discussed herein. The machine is connected (e.g., networked) to other machines and is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the apparatus 200 includes a processor 802 (e.g., a central processing unit (CPU)), a main memory 804 (e.g., random access memory (a type of volatile memory)), and static memory 806 (e.g., static random access memory (a type of volatile memory)), which communicate with each other via bus 808. The apparatus 200 may also include a disk drive unit 816 and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by apparatus 200, with the main memory 804 and processor 802 also constituting machine-readable, tangible media. The data structures and instructions 824 may further be transmitted or received over a computer network 850 via network interface device 820 utilizing any one of a number of well-known transfer protocols.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the apparatus 200) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 802 (e.g., a general-purpose processor) configured using software, the processor 802 may be configured as respective different hardware modules at different times. Software may accordingly configure the processor 802, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processor or processors 802 may be located in a single location, while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques of using PIM in a P2MP network may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
   advertising a label by way of a point-to-multipoint (P2MP) label switched path (LSP), the label uniquely identifying the P2MP LSP from a plurality of different P2MP label switched paths;
   receiving a protocol independent multicast (PIM) message by way of a point-to-point (P2P) LSP in response to the advertisement, the PIM message including the label;
   identifying the label included in the PIM message to correspond with the P2MP LSP; and
   reflecting the PIM message by way of the P2MP LSP based on the identification.

2. The method of claim 1, wherein the advertisement of the label comprises:
   encoding the label with a PIM hello message; and
   transmitting the PIM hello message by way of the P2MP LSP.

3. The method of claim 2, further comprising encoding a static multicast route with the PIM hello message.

4. The method of claim 1, wherein the PIM message is reflected without modification.

5. A method comprising:
   receiving a label by way of a point-to-multipoint (P2MP) label switched path (LSP), the label uniquely identifying the P2MP LSP from a plurality of different P2MP label switched paths;
   identifying a protocol independent multicast (PIM) message associated with the P2MP LSP;
   encoding the label with the PIM message; and
   transmitting the PIM message by way of a point-to-point (P2P) LSP.

6. The method of claim 5, wherein the PIM message is a Protocol independent multicast (PIM) join message.

7. The method of claim 5, wherein the PIM message includes the label and a unicast label.

8. The method of claim 5, wherein the PIM message is a Protocol independent multicast (PIM) prune message.

9. The method of claim 5, wherein the label received by way of the P2MP LSP is encoded with a Protocol independent multicast (PIM) hello message.

10. An apparatus comprising:
    a multicast module configured to:
    advertise a label by way of a point-to-multipoint (P2MP) label switched path (LSP), the label uniquely identifying the P2MP LSP from a plurality of different P2MP label switched paths;
    receive a protocol independent multicast (PIM) message by way of a point-to-point (P2P) LSP in response to the advertisement, the PIM message including the label;
    identify the label included in the PIM message to correspond with the P2MP LSP; and
    reflect the PIM message by way of the P2MP LSP based on the identification.

11. The apparatus of claim 10, wherein the advertisement of the label comprises:
    encoding the label with a PIM hello message; and
    transmitting the PIM hello message by way of the P2MP LSP.

12. The apparatus of claim 10, wherein the reflection of the PIM message is configured to emulate a multipoint-to-multipoint LSP.

13. The apparatus of claim 10, wherein the PIM message is reflected downstream.

14. The apparatus of claim 10, wherein the PIM message is received from a downstream device of the P2MP LSP.

15. The apparatus of claim 10, wherein the P2MP LSP comprises a plurality of traffic engineering links.

16. An apparatus comprising:
    a multicast module configured to:
    receive a label by way of a point-to-multipoint (P2MP) label switched path (LSP), the label uniquely identifying the P2MP LSP from a plurality of different P2MP label switched paths;
    identify a protocol independent multicast (PIM) message associated with the P2MP LSP;
    encode the label with the PIM message; and
    transmit the PIM message by way of a point-to-point (P2P) LSP.

17. The apparatus of claim 16, wherein the PIM message is transmitted upstream.

18. The apparatus of claim 16, wherein the PIM message includes the label and a unicast label, the label being encoded next to the unicast label.

19. The apparatus of claim 16, wherein the PIM message is a Protocol independent multicast (PIM) join message.

20. The apparatus of claim 16, wherein the PIM message is a Protocol independent multicast (PIM) prune message.

* * * * *